Patented Oct. 28, 1924.

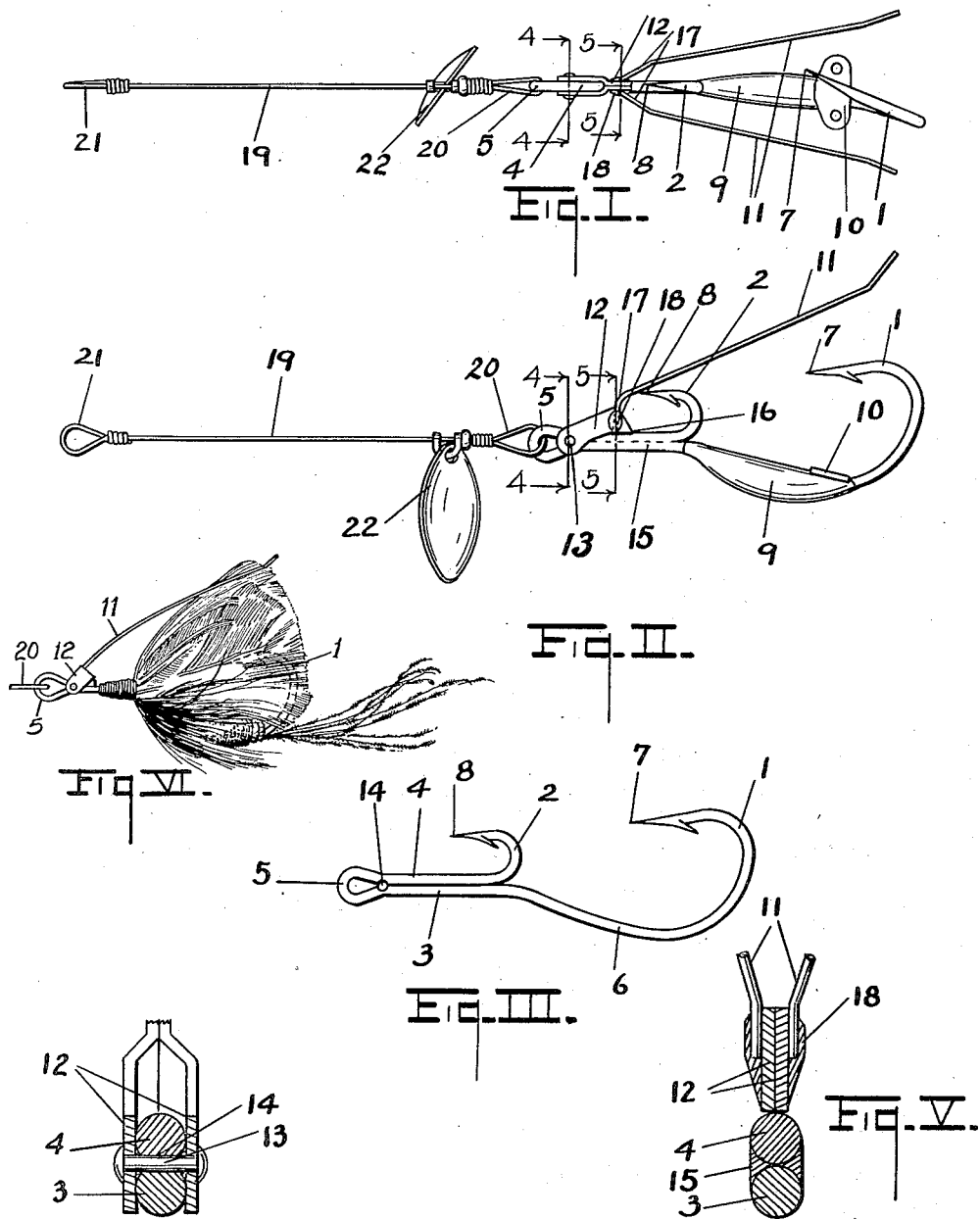

1,513,011

UNITED STATES PATENT OFFICE.

SAMUEL G. RUSSELL AND TILDEN ROBB, OF KALAMAZOO, MICHIGAN, ASSIGNOR TO SHAKESPEARE COMPANY, OF KALAMAZOO, MICHIGAN.

WEEDLESS FISHHOOK.

Application filed September 14, 1922. Serial No. 588,149.

*To all whom it may concern:*

Be it known that we, SAMUEL G. RUSSELL and TILDEN ROBB, citizens of the United States, residing at the city and county of Kalamazoo, State of Michigan, have invented certain new and useful Improvements in Weedless Fishhooks, of which the following is a specification.

This invention relates to improvements in weedless fish hooks.

The main object of this invention is to provide an improved weedless fish hook to which a bait such as a live frog or pork rind may be effectively attached, the hook being supported and guarded as it is drawn through the weeds or lily pads so as to effectively receive the strike of a fish and, at the same time, the attached bait is effectively protected and guarded so that it is not likely to be torn from the hook.

A further object is to provide an improved weedless hook having these advantages in which the parts are economical to produce and assemble.

Objects pertaining to details and economies of our invention will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing forming a part of this application, in which:

Fig. I is a plan view of our improved weedless hook.

Fig. II is a side elevation thereof.

Fig. III is a side elevation of the main and auxiliary hooks prior to the attachment of the other parts thereto.

Fig. IV is an enlarged detail section on a line corresponding to line 4—4 of Figs. I and II showing details of the guard attachment.

Fig. V is an enlarged detail section on a line 5—5 of Figs. I and II showing details of the guard.

Fig. VI is a side elevation of our improved hook as a feathered hook, the feathers being substituted in lieu of the auxiliary or bait attaching hook.

In the drawing the sectional views are taken looking in the direction of the little arrows at the ends of the section lines and similar numerals of reference refer to similar parts throughout the several views.

Referring to the drawing, we provide a main hook 1 and an auxiliary or bait attaching hook 2. These hooks are provided with straight shank portions 3 and 4 respectively attached at their forward ends by the loop 5 providing a draft attaching eye, the hooks and their shanks being formed integrally.

The main hook has a downwardly curved body portion 6 at the rear of the auxiliary hook. The barbed points 7 and 8 of the hooks are directed mainly in the line of draft, the point 7 being slightly deflected to better receive the strike of the fish. The point 8 of the hook is in the plane of the superposed shanks 3 and 4.

The elongated weight 9 is molded upon the curved body 6 of the hook and preferably extends from a point adjacent the auxiliary hook to the bottom of the main hook, the main portion of the weight being below the body of the hook. The bait attaching plate or cross piece 10 is secured at the rear of the weight, preferably by molding it in the weight which is, in practice, formed of lead or a lead composition.

The rearwardly diverging guard arms 11 are secured to the bifurcated coupling member 12 which embraces the shanks 3 and 4 and is secured thereto by the pivot 13, the pivot hole 14 being formed by the shanks adjacent the eye. A portion of the hole is formed in each shank so that they are not materially weakened by forming the pivot hole. The superposed shanks are preferably soldered together as indicated at 15. The coupling member 12 has a raised portion 16 normally resting upon the shanks. The arms have an abrupt downward offset 17 near their front ends and are secured to the coupling member as by the solder 18 so that the point of the auxiliary hook is effectively guarded.

We preferably provide a link 19 having an eye 20 at its rear end engaged with the eye of the hooks and an eye 21 at its front end adapted to receive the line. A spoon-like spinner 22 is rotatably mounted on this draft link.

By this arrangement of parts the hooks are both effectively guarded so that they are not likely to engage weeds. The hooks are kept in an upright position to effectively receive the strike of the fish and also to protect the bait such as a frog, minnow or pork rind, as may be desired. The attaching plate or cross piece 10 has holes therein for convenience in tying the bait to the hook.

By forming the hook with a downward curve therein as described and having the point of the hook lie substantially in the line of draft, the guard arms are normally supported with a minimum of angle which facilitates drawing the hook through the weeds, the guard arms being less likely to engage the weeds than is the case where they stand out from the hook at a greater angle.

In Fig. VI we show our improvements as embodied in feathered hooks and in this embodiment the auxiliary or bait attaching hook 2 is omitted and the feathers secured to the shank of the hook; otherwise the hook is the same as in the embodiment described.

Our improved weedless hook is simple and economical in its parts and, at the same time, is strong and durable in use. It is very effective for the purpose for which it is designed.

Having thus described our invention what we claim as new and desire to secure by Letters Patent is:

1. In a weedless hook, the combination of a main hook and an auxiliary bait attaching hook each provided with straight superposed shanks joined by a loop at their front ends providing a draft eye, the main hook having a downwardly curved body portion at the rear of the auxiliary hook, an elongated weight molded upon said body hook and extending rearwardly from a point adjacent the auxiliary hook to the bottom of the curve, there being a bait attaching cross piece at the rear end of the weight attached to the hook thereby, a guard comprising a bifurcated coupling member pivoted to the shanks adjacent the said eye to embrace and normally rest upon the shanks, there being a pivot hole for the coupling member pivot formed between said shanks, and a pair of rearwardly diverging arms mounted at the rear end of said coupling member to extend upwardly and rearwardly therefrom, said arms having abrupt downward offsets at their front ends, so that the point of the auxiliary hook lies within the plane of the arms.

2. In a weedless hook, the combination of a main hook and an auxiliary bait attaching hook each provided with straight superposed shanks joined by a loop at their front ends providing a draft eye, the main hook having a downwardly curved body portion at the rear of the auxiliary hook, a guard comprising a bifurcated coupling member pivoted to the shanks adjacent the said eye to embrace and normally rest upon the shanks, there being a pivot hole for the coupling member pivot, and a pair of rearwardly diverging arms mounted at the rear end of said coupling member to extend upwardly and rearwardly therefrom, said arms having abrupt downward offsets at their front ends so that the point of the auxiliary hook lies within the plane of the arms.

3. In a weedless hook, the combination of a main hook and an auxiliary bait attaching hook each provided with straight superposed shanks joined by a loop at their front ends providing a draft eye, the main hook having a downwardly curved body portion at the rear of the auxiliary hook, an elongated weight molded upon said body hook and extending rearwardly from a point adjacent the auxiliary hook to the bottom of the curve, there being a bait attaching cross piece at the rear end of the weight attached to the hook thereby, a guard comprising a bifurcated coupling member pivoted to the shanks adjacent the said eye to embrace and normally rest upon the shanks, and a pair of rearwardly diverging arms mounted on said coupling member to extend upwardly and rearwardly therefrom.

4. In a weedless hook, the combination of a main hook and an auxiliary bait attaching hook each provided with straight superposed shanks joined by a loop at their front ends providing a draft eye, the main hook having a downwardly curved body portion at the rear of the auxiliary hook, a guard comprising a bifurcated coupling member pivoted to the shanks adjacent the said eye to embrace and normally rest upon the shanks, and a pair of rearwardly diverging arms mounted on said coupling member to extend upwardly and rearwardly therefrom.

5. In a weedless hook, the combination of a hook provided with a doubled shank providing a draft eye and a flat guard support, a guard comprising a coupling member bifurcated to embrace the sides of said flat guard support and pivoted thereto adjacent said eye to normally rest upon the shank, there being a pivot hole for the coupling member pivot formed between the members of the shank, and a pair of rearwardly diverging arms mounted on said coupling member to extend upwardly and rearwardly therefrom.

6. In a weedless hook, the combination of a hook provided with a doubled shank providing a draft eye, the members of the shank at the rear of the eye being in contacting superimposed relation, a guard comprising a bifurcated coupling member pivoted to said shank to normally rest thereon, there being a pivot hole for the coupling member pivot formed between the members of the shank, and guard arms mounted on said coupling member.

In witness whereof, we have hereunto set our hands and seals.

SAMUEL G. RUSSELL. [L. S.]
TILDEN ROBB. [L. S.]